(12) United States Patent
Hikmet et al.

(10) Patent No.: US 12,162,208 B2
(45) Date of Patent: Dec. 10, 2024

(54) METHOD FOR PRINTING OBJECTS WITH INCLINATION ANGLES LESS THAN 45° WITH RESPECT TO BUILDING PLATE

(71) Applicant: SIGNIFY HOLDING B.V., Eindhoven (NL)

(72) Inventors: Rifat Ata Mustafa Hikmet, Eindhoven (NL); Paulus Albertus Van Hal, Waalre (NL); Cornelis Adrianus Maria Huijben, Waalre (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 687 days.

(21) Appl. No.: 17/281,382

(22) PCT Filed: Sep. 30, 2019

(86) PCT No.: PCT/EP2019/076340
§ 371 (c)(1),
(2) Date: Mar. 30, 2021

(87) PCT Pub. No.: WO2020/070033
PCT Pub. Date: Apr. 9, 2020

(65) Prior Publication Data
US 2022/0032535 A1    Feb. 3, 2022

(30) Foreign Application Priority Data
Oct. 1, 2018 (EP) .................... 18197848

(51) Int. Cl.
*B29C 64/118* (2017.01)
*B29C 64/209* (2017.01)
(Continued)

(52) U.S. Cl.
CPC .......... *B29C 64/118* (2017.08); *B29C 64/209* (2017.08); *B29C 64/245* (2017.08);
(Continued)

(58) Field of Classification Search
CPC ..................................................... B29C 64/118
See application file for complete search history.

(56) References Cited

U.S. PATENT DOCUMENTS 9,174,388 B2 * 11/2015 Batchelder ............ B29C 64/106
9,216,543 B1 * 12/2015 Lisitsin .................... C08K 3/36
(Continued)

FOREIGN PATENT DOCUMENTS

| CN | 106424723 A | 2/2017 |
| CN | 106553335 A | 4/2017 |

(Continued)

*Primary Examiner* — Benjamin A Schiffman

(57) ABSTRACT

Method for producing a 3D item (1) by means of fused deposition modelling, the method comprising a 3D printing stage comprising layer-wise depositing an extrudate (321) comprising 3D printable material (201), to provide the 3D item (1) comprising 3D printed material (202), wherein the 3D item (1) comprises a plurality of layers (322) of 3D printed material (202), wherein the 3D printing stage comprises: •—a vertical support providing stage comprising providing a first layer (1100) of 3D printed material (202), wherein the first layer (1100) has a first layer top part (1110) with a first layer top height (HI 1) relative to the substrate (1550) and a first layer bottom part (1120) with a first layer bottom height (H12) relative to the substrate (1550), wherein the first layer (1100) has a first layer height (HI) defined by the difference between the first layer top height (HI 1) and the first layer bottom height (H12), wherein the value of the first layer bottom height (H12) is at least equal to the value of the first layer height (HI), and •—an in-air printing stage comprising supportless depositing a second layer (1200) of 3D printed material (202) adjacent to and in contact with the first layer (1100), wherein the second layer (1200) has a second layer top part (1210), wherein at least
(Continued)

part of the second layer top part (1210) extends over at least part of the first layer top part (1100) and is conformal therewith.

7 Claims, 10 Drawing Sheets

(51) Int. Cl.
  *B29C 64/245* (2017.01)
  *B29C 64/264* (2017.01)
  *B29C 64/321* (2017.01)
  *B29C 64/40* (2017.01)
  *B33Y 10/00* (2015.01)
  *B33Y 30/00* (2015.01)
  *B33Y 40/00* (2020.01)
  *B29C 64/205* (2017.01)
  *B33Y 80/00* (2015.01)

(52) U.S. Cl.
  CPC .......... *B29C 64/264* (2017.08); *B29C 64/321* (2017.08); *B29C 64/40* (2017.08); *B33Y 10/00* (2014.12); *B33Y 30/00* (2014.12); *B33Y 40/00* (2014.12); *B29C 64/205* (2017.08); *B29K 2995/0029* (2013.01); *B33Y 80/00* (2014.12)

(56) References Cited

U.S. PATENT DOCUMENTS

| | | | |
|---|---|---|---|
| 11,179,884 B2* | 11/2021 | Guimbretiere | B33Y 50/02 |
| 11,241,849 B2* | 2/2022 | Boonekamp | B29C 64/106 |
| 11,813,790 B2* | 11/2023 | Rowe | B33Y 80/00 |
| 2015/0352792 A1* | 12/2015 | Kanada | B29C 64/393 |
| | | | 700/98 |
| 2016/0144574 A1 | 5/2016 | Eilken et al. | |
| 2017/0136706 A1 | 5/2017 | Hakkaku | |
| 2019/0210286 A1* | 7/2019 | Newell | B29C 64/393 |
| 2021/0039319 A1* | 2/2021 | Rieger | B29C 64/393 |
| 2021/0339463 A1* | 11/2021 | Hikmet | B29C 64/336 |

FOREIGN PATENT DOCUMENTS

| | | | | |
|---|---|---|---|---|
| CN | 108349158 A | | 7/2018 | |
| EP | 3127635 A1 * | | 2/2017 | ............. B22F 10/00 |
| JP | 2015229338 A | | 12/2015 | |
| JP | 2017518898 A | | 7/2017 | |
| JP | 2018023982 A | | 2/2018 | |
| WO | 2018001690 A1 | | 1/2018 | |
| WO | 2018039261 A1 | | 3/2018 | |

* cited by examiner

METHOD FOR PRINTING OBJECTS WITH INCLINATION ANGLES LESS THAN 45° WITH RESPECT TO BUILDING PLATE

CROSS-REFERENCE TO PRIOR APPLICATIONS

This application is the U.S. National Phase application under 35 U.S.C. § 371 of International Application No. PCT/EP2019/076340, filed on Sep. 30, 2019, which claims the benefit of European Patent Application No. 18197848.7, filed on Oct. 1, 2018. These applications are hereby incorporated by reference herein.

FIELD OF THE INVENTION

The invention relates to a method for manufacturing a 3D (printed) item and to a software product for executing such method. The invention also relates to the 3D (printed) item obtainable with such method. Further, the invention relates to a lighting device including such 3D (printed) item. Yet further, the invention also relates to a 3D printer, such as for use in such method.

BACKGROUND OF THE INVENTION

The creation of overhang or undercut formation is known in the art. US2016/0144574, for instance, describes a method for adapting a 3D printing model, the method comprising calculating a layer representation model on the basis of a 3D object model of an object, the layer representation model being built up from a multitude of coplanar and confined adjacent layers, wherein the build-up direction corresponds to a printing direction of a 3D printing apparatus; determining a plurality of overhang regions in the layer representation model where the boundary edges of first layers extend over the boundary edges of second layers, the first layers being directly adjacent and subsequent to the second layers when going into the build-up direction of the layer representation model; determining a local overhang angle in each of the plurality of overhang regions, the local overhang angle being defined as the angle between the normal axis of the coplanar layers in build-up direction and the local tangent between the boundary edges of two adjacent layers; adapting the layer representation model by re-defining the boundary edges of layers in the overhang regions so that the local overhang angle remains below a predetermined overhang threshold angle; and outputting the adapted layer representation model as 3D printing model to the 3D printing apparatus.

SUMMARY OF THE INVENTION

Within the next 10-20 years, digital fabrication will increasingly transform the nature of global manufacturing. One of the aspects of digital fabrication is 3D printing. Currently, many different techniques have been developed in order to produce various 3D printed objects using various materials such as ceramics, metals and polymers. 3D printing can also be used in producing molds which can then be used for replicating objects.

For the purpose of making molds, the use of polyjet technique has been suggested. This technique makes use of layer by layer deposition of photo-polymerisable material which is cured after each deposition to form a solid structure. While this technique produces smooth surfaces the photo curable materials are not very stable and they also have relatively low thermal conductivity to be useful for injection molding applications.

The most widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Other terms for FDM are "fused filament fabrication" (FFF) or "filament 3D printing" (FDP), which are considered to be equivalent to FDM. In general, FDM printers use a thermoplastic filament, which is heated to its melting point and then extruded, layer by layer, (or in fact filament after filament) to create a three-dimensional object. FDM printers are relatively fast, low cost and can be used for printing complicated 3D objects. Such printers are used in printing various shapes using various polymers. The technique is also being further developed in the production of LED luminaires and lighting solutions.

As indicated above, FDM especially works on an "additive" principle by laying down plastic material in layers. Typically, the layers are added on top of each other with a fixed layer thickness. In this way various objects can be created. In some applications it is necessary to print objects where part of the object needs to be printed at shallow angles with respect to the building plate. However, stacking layers on top of each other has its limits. For example, a structure such as a cone or a pyramid cannot be printed when the angle with respect to the surface is lower than 45°. In order to print such layers, one needs to use so-called support structures. In some case, support structures are printed using water soluble polymers which are then removed after printing. However, printing support structures increase the time necessary to print and may lead to defect points. Dissolution of support structures may also involve an extra step. Inclined layer printing is another technique. In this technique instead placing all the layers parallel on top of each other to build an object layers are placed at an angle with respect to the platform surface on the surface of the object. However, this method may not be used for obtaining thin walled objects, such as e.g. may be useful for luminaires.

Hence, it is an aspect of the invention to provide an alternative 3D printing method and/or 3D (printed) item which preferably further at least partly obviate(s) one or more of above-described drawbacks. The present invention may have as object to overcome or ameliorate at least one of the disadvantages of the prior art, or to provide a useful alternative.

Amongst others, herein a new method is suggested which may include combining horizontal printing with vertical printing in order to print objects with angles less than 45° relative to the substrate (such as a "building plate" or "build plate"). Horizontal printing of overhangs can be realized for example when printing a cylinder up to a certain height by stapling layers of polymer on top of each other in the vertical direction. Subsequently, the nozzle is set to move in the x-y plane and deposit layers which have an overlapping area of especially at maximum of 50% with one of the yet 3D printed layers. This means that the nozzle is partly blocked, especially at most for 50%, by the previously printed layer, and deposits the amount of 3D printable material as 3D printed layer next to it. This may lead to a good attachment of the new layer to the previously printed layer, at essentially the same height (relative to the substrate), as the previously printed layer.

Hence, in a first aspect the invention provides a method for producing a 3D item, especially by means of fused deposition modelling, the method comprising a 3D printing stage comprising layer-wise depositing an extrudate comprising 3D printable material, to provide the 3D item comprising 3D printed material, wherein the 3D item comprises a plurality of layers of 3D printed material, wherein the 3D printing stage especially comprises a vertical support providing stage and an in-air printing stage. In specific embodiments, the vertical support providing stage comprises providing a first layer of 3D printed material, wherein the first layer has a first layer top part with a first layer top height (H11) relative to a substrate and a first layer bottom part with a first layer bottom height (H12) relative to the substrate, wherein the first layer has a first layer height (H1) defined by the difference between the first layer top height (H11) and the first layer bottom height (H12), wherein especially the value of the first layer bottom height (H12) is at least equal to the value of the first layer height (H1). Further, in specific embodiments the in-air printing stage comprises (a supportless) depositing a second layer of 3D printed material in contact with the first layer and adjacent to the first layer in a direction substantially parallel to the substrate, wherein the second layer has a second layer top part, wherein at least part of the second layer top part extends over at least part of the first layer top part and is especially conformal therewith. Such method may especially be executed with a fused deposition modeling 3D printer, which comprises a printer head comprising a printer nozzle.

With such method, it is possible to create horizontal layers in-air, without using a support. The combination of such horizontal layers with vertical layers allows 3D printing structures with essentially any (overall) angle relative to the substrate. In contrast to prior art methods, relative large overhangs may be created, nearly in the order of a full layer, instead of at maximum a half layer.

Note that the term "in air" does not exclude the printing in other gasses than air. This term especially refers to the fact that the layer is printed as a kind of overhang layer, without the necessity of having a support under the second layer. Hence, the phrase "in-air . . . supportless", and similar phrases, especially indicate that the second layer is printed as a kind of floating layer or layer without support below the second layer, and with the first layer—at about the same height—as essentially only support. The second layer is attached to the first layer, essentially like in vertical printing, but now at essentially the same height and adjacent to the first layer in a direction substantially parallel to the substrate. In this way, a second layer at essentially the same height as the first layer may be obtained. This process may be repeated, by which a horizontal 3D printed part of the item may be created. Hence, by adhesion the second layer is attached to the first layer, without the necessity of a support under the second layer. The first layer is basically used as only support to the second layer. Instead of the term "in-air printing stage" also the term "horizontal printing stage" may be applied.

As indicated above, the invention provides a method for producing a 3D item by means of fused deposition modelling the method comprising a 3D printing stage comprising layer-wise depositing an extrudate comprising 3D printable material, to provide the 3D item comprising 3D printed material, wherein the 3D item comprises a plurality of layers of 3D printed material. In general, there will be more than the first layer and the second layer, as the first layer is configured at a height over the support. Hence, the first layer may be a layer on one or more other 3D printed layers.

As indicated above, the method may be executed with a fused deposition modeling 3D printer, comprising a printer head comprising a printer nozzle. Further basic principles in relation to 3D FDM printing are also elucidated below. Hence, the method is especially used for producing a 3D item by means of fused deposition modelling (FDM).

The 3D printing stage comprises layer-wise depositing an extrudate comprising 3D printable material. Hence, the 3D printing process especially provides the 3D item which comprises a plurality of layers of 3D printed material, which are especially formed due to the layer-wise deposition. 3D printable material is introduced in the printer head, and leaves the nozzle as extrudate and forms a layer of 3D printed material on the substrate or e.g. an earlier 3D printed layer on the substrate.

Especially, herein the 3D printing stage comprises a vertical support providing stage and an in-air printing stage. The method may also comprise one or more further stages, like a heating stage (e.g. for smoothening the surface). Other stages may also be available. Preceding to the 3D printing stage, and/or between the vertical support providing stage and an in-air printing stag, and/or after the vertical support providing stage, in embodiments there may be one or more further stages.

Further, the term "stage" may also refer to a sequence of stages, such as e.g. a sequence of printing stages wherein in between one or more functional components or other components are integrated in or arranged on the thus obtained 3D printed material.

The vertical support providing stage comprises providing a first layer of 3D printed material. In general, this will be a layer that is available on one or more earlier printed 3D layers (this will however not be the case when a second layer has the function of a first layer for an adjacent other second layer). Hence, this first layer has a non-zero height over the substrate. The first layer may be a top layer of a stack of layers. However, the first layer is not necessarily a top layer of a stack of layers; it may also be an intermediate layer of a stack of 3D printed layers.

The first layer has a first layer top part with a first layer top height (H11) relative to the substrate and a first layer bottom part with a first layer bottom height (H12) relative to the substrate. Basically, the layer may be divided in a top part and a bottom part. In embodiments, they may each relate to 50% of the layer (in a cross-sectional view), though other ratios may also be possible. However, in general the top part will be at least 10% and the bottom part will also be at least 10% of the layer (in a cross-sectional view), with both parts counting up to 100%. The cross-sectional view may refer to a view perpendicular to a layer axis. In embodiments, it may refer to two halves, with a horizontal division plane.

Another subdivision may be a first side part and a second side part. In embodiments, they may each relate to 50% of the layer (in a cross-sectional view), though other ratios may also be possible. However, in general the first side part will be at least 10% and the second side part will also be at least 10% of the layer (in a cross-sectional view), with both parts counting up to 100%. The cross-sectional view may refer to a view perpendicular to a layer axis. In embodiments, it may refer to two halves, with a vertical division plane.

The first layer has a first layer height (H1) defined by the difference between the first layer top height (H11) and the first layer bottom height (H12). Hence, in embodiments the first layer top height (H11) and the first height (H1) define the layer height (H) of the first layer. Especially, the value of the first layer bottom height (H12) is at least equal to the value of the first layer height (H1), such as at least twice the first layer height (H1).

Further, the 3D printing stage may include one or more horizontal printing stages. Of course, the 3D printing stage may also include one or more vertical printing stages. Part of the 3D item may be printed horizontally and part of the 3D printed item may be printed vertically. In this way essentially any angle with the substrate may be created, even angles smaller than 45°. Hence, in embodiments the printing stage comprises an in-air printing stage comprising (supportless) depositing a second layer of 3D printed material in contact with the first layer and adjacent to the first layer (1100) in a direction substantially parallel to the substrate, wherein the second layer has a second layer top part, wherein at least part of the second layer top part extends over at least part of the first layer top part and is conformal therewith.

Like the first layer, the second layer may schematically be divided in different parts. The second layer has a second layer top part with a second layer top height (H21) relative to the substrate, and a second layer bottom part with a second layer bottom height (H22) relative to the substrate. Basically, the layer may be divided in a top part and a bottom part. In embodiments, they may each relate to 50% of the layer (in a cross-sectional view), though other ratios may also be possible. However, in general the top part will be at least 10% and the bottom part will also be at least 10% of the layer (in a cross-sectional view), with both parts counting up to 100%. The cross-sectional view may refer to a view perpendicular to a layer axis. In embodiments, it may refer to two halves, with a horizontal division plane.

Another subdivision may be a second side part and a second side part. In embodiments, they may each relate to 50% of the layer (in a cross-sectional view), though other ratios may also be possible. However, in general the second side part will be at least 10% and the second side part will also be at least 10% of the layer (in a cross-sectional view), with both parts counting up to 100%. The cross-sectional view may refer to a view perpendicular to a layer axis. In embodiments, it may refer to two halves, with a vertical division plane.

Part of a side part, for the sake of definition we may use the first side part, is in (physical) contact with the first layer, or with a second side part of the first layer. One may even state that part of the first side part of the second layer forms an overhang on the first layer. In this way, at least part of a side surface of the second layer is in contact with and conformal to part of the first layer. However, the overhang is in general defined relative to first layer top part and the second layer top part, wherein, as indicated above, at least part of the second layer top part extends over at least part of the first layer top part and is conformal therewith. Hence, this second layer top part provides together with the first layer top part, the connection, such as by adhesion, and/or covalent binding, and/or chemical binding, between the first layer and the second layer. In this way, it is possible to 3D print horizontally printed, without the necessity of a support (for the second layer).

The second layer may have a kind of metal pea whistle shape, with the chamber (wherein in the metal pea whistle a cork ball may be available) forming substantial part of the (cross-section) of the second layer, and with the mouth part or airflow inlet part over at least part of the first layer top part and conformal therewith. As will be indicated below, the formation of second layers may be repeated to obtain horizontally printed 3D parts. This leads to the formation of an array of metal pea whistle shaped layers, wherein each airflow inlet part of a layer is over at least part of the layer top part and conformal therewith of one adjacent other layer. Hence, the cross-section perpendicular to a layer axis of the second layer may not be symmetrical, as the overhang is only directed to one side.

To obtain good horizontal layer formation, it appears useful when the nozzle of the 3D printer is only partly over the support layer or first layer. In this way, the nozzle may be partly blocked, which may lead to the kind of metal pea whistle shaped form. Hence, in embodiments the printer nozzle has a nozzle area (An), wherein the in-air printing stage comprises supportless depositing the second layer while maintaining 10-50% of the nozzle area (An) over the first layer at a maximum distance of 0.5*H1, such as at maximum 0.25*H1, such as especially 15-35% of the nozzle area (An) over the first layer at a maximum distance of 0.5*H1, such as at maximum 0.25*H1. The minimum distance (for the 10-50%, or 15-35%, of the nozzle area) at one or more positions may such that the nozzle may (nearly) be in contact with the first layer, or at a distance of a few μm, such as 10-50 μm, above the first layer.

In embodiments, the first layer has a first layer width (W1), wherein the printer nozzle has a nozzle width (D), wherein the method comprises maintaining the printer nozzle partly over the first layer such that a projection in a horizontal plane of the first layer width (W1) and the nozzle width (D) have an overlap (O1) selected from the range of 10-50%, especially 15-35% of the first layer width (W1).

The 3D printed layers may have curved edges, which allow the formation of the overhang by a second layer. The width especially refers to the largest width (perpendicular to a layer axis). The width may thus vary over the height of the layer.

For a good connection between the layers, it may be useful when the first layer is not completely cooled down. Especially, it may be desirable that the first layer has a temperature that is at least equal to the glass transition temperature of the 3D printable material (or the polymeric material therein), or higher. Hence, in embodiments the 3D printable material has a first glass transition temperature Tg1, wherein the in-air printing stage comprises a supportless depositing a second layer of 3D printed material in contact with the first layer and adjacent to the first layer in a direction substantially parallel to the substrate, wherein the first layer is at a temperature of at least the first glass transition temperature Tg1. For instance, in embodiments the temperature of the first layer at the stage of the in-air printing stage may be between the first glass transition temperature Tg1 and the first melting temperature Tm1, especially between about Tg1 and Tg1+(0.75*(Tm1−Tg1)), such as between 1.1*Tg1 and (0.5*(Tm1−Tg1)).

Alternatively, a part of the first layer that is contacted with a part of the second layer is brought at a temperature of at least the first glass transition temperature Tg1. Hence, the part on which the overhang is created may be at a temperature of at least the first glass transition temperature Tg1 or may be brought at such temperature, for instance due to the fact that the relative hot extrudate contacts the first layer. In this way, the first layer may be locally heated to a temperature of at least the first glass temperature. When both the first layer and the second layer during the in-air printing stage are at or above the (first) glass temperature, adhesion may be improved. For instance, polymers from one layer may penetrate into the other layer, and vice versa. This may provide and/or promote adhesion between the first layer and the second layer. The above indicated values for the temperature of the first layer may also be used for the temperature of the part of the first layer that is or is brought at at least the first glass transition temperature.

In general, the material of the first layer is essentially the same as of the second layer, though this is not necessarily the case.

The generation of a horizontal layer may especially be done without essential impact on the stability of the 3D printed item under construction when the part of the 3D printed item which includes the first layer, is a stable 3D item. For instance, this may be a relative large body, having a weight that is substantial larger than the weight of the horizontally printed layer. For instance, in embodiments the weight of the horizontally printed layer may be less than 20%, such as less than 10%, like less of the yet available material of the 3D printed item under construction.

Alternatively or additionally, the 3D printed item may have some intrinsic stability for the horizontal layer. For instance, this may be the case when the material of the 3D printed item can has a larger torque than the second layer. The larger torque of the yet available material compensates for the torque of the second layer(s). Further, the 3D printed item may stick to the substrate.

Yet in further embodiments, a force may be applied to the yet available material of the 3D printed item under construction to compensate for the torque that may be generated by the second layer.

However, in embodiments the 3D printed items under construction may have a shape that provides stability per se for the second layer. This may e.g. be the case when the 3D printed item under construction provides a bearing (function) for the horizontal layer(s). Hence, basically the same rules may be used when building a house and constructing a balcony or a slanted roof.

For instance, in embodiments the yet available material of the 3D printed item under construction forms a substantially enclosure shape, like a ring (which may be circular or rectangular, or have another shape), or a closed shape, like a plate (which may be circular or rectangular, or have another shape). Therefore, in specific embodiments the first layer is configured as a first enclosure enclosing a first cross-sectional area (A1), and the method may comprise depositing the second layer of 3D printed material adjacent to and in contact with the first layer to provide a second enclosure having a second cross-sectional area (A2) being larger or smaller than the first cross-sectional area (A1). This may e.g. allow printing of a conical shape or a pyramidal shape, etc.

As indicated above, the in-air printing stage may be repeated a number of times. In this way a horizontal array of (second) layers may be 3D printed. A printed layer, printed during the in-air printing stage may be used as support layer, i.e. first layer, for a next second layer, etc. Therefore, in embodiments the method may comprise executing the in-air printing stage a plurality of times. Hence, in such embodiments the second layer obtained in an in-air printing stage that is followed by a next in-air printing stage (of a next and adjacent second layer), may be used as the first layer in that next in-air printing stage.

This allows, as indicated above, the generation of essentially any angle, as vertical and horizontal printing may be combined. Hence, in specific embodiments the layers have longitudinal axes (A) and a plane parallel or tangential to two or more of the plurality of the longitudinal axes (A) has a smallest angle (θ) with a horizontal selected from the range of 0-45°. However, other angles may of course also be possible. Especially, in embodiments the layers have longitudinal axes A and a plane parallel to two or more of the plurality of the longitudinal axes A, with two or more of the longitudinal axes A coinciding with the plane, has a smallest angle θ with a horizontal selected from the range of 0-45°. Especially, in other embodiments a plane tangential and parallel to two or more of the plurality of the longitudinal axes A has a smallest angle θ with a horizontal selected from the range of 0-45°. The (smallest) angle with the horizontal is also indicates as "inclination angle". With the present invention, the inclination angle may essentially any angle between 0-90° with a horizontal, such as in embodiments the substrate.

For specific applications, such as some lighting applications, it may be useful when the 3D printable material is light transmissive material. Therefore, in embodiments the 3D printable material comprises light transmissive material.

Below, some further aspects of 3D (FDM) printing and useful 3D printable materials (and thus 3D printed materials) are elucidated.

As indicated above, the method comprises depositing during a printing stage 3D printable material. Herein, the term "3D printable material" refers to the material to be deposited or printed, and the term "3D printed material" refers to the material that is obtained after deposition. These materials may be essentially the same, as the 3D printable material may especially refer to the material in a printer head or extruder at elevated temperature and the 3D printed material refers to the same material, but in a later stage when deposited. The 3D printable material is printed as a filament and deposited as such. The 3D printable material may be provided as filament or may be formed into a filament. Hence, whatever starting materials are applied, a filament comprising 3D printable material is provided by the printer head and 3D printed. The term "extrudate" may be used to define the 3D printable material downstream of the printer head, but not yet deposited. The latter is indicated as "3D printed material". In fact, the extrudate comprises 3D printable material, as the material is not yet deposited. Upon deposition of the 3D printable material or extrudate, the material is thus indicated as 3D printed material. Essentially, the materials are the same material, as the thermoplastic material upstream of the printer head, downstream of the printer head, and when deposited, is essentially the same material.

Herein, the term "3D printable material" may also be indicated as "printable material. The term "polymeric material" may in embodiments refer to a blend of different polymers, but may in embodiments also refer to essentially a single polymer type with different polymer chain lengths. Hence, the terms "polymeric material" or "polymer" may refer to a single type of polymers but may also refer to a plurality of different polymers. The term "printable material" may refer to a single type of printable material but may also refer to a plurality of different printable materials. The term "printed material" may refer to a single type of printed material but may also refer to a plurality of different printed materials.

Hence, the term "3D printable material" may also refer to a combination of two or more materials. In general, these (polymeric) materials have a glass transition temperature $T_g$ and/or a melting temperature $T_m$. The 3D printable material will be heated by the 3D printer before it leaves the nozzle to a temperature of at least the glass transition temperature, and in general at least the melting temperature. Hence, in a specific embodiment the 3D printable material comprises a thermoplastic polymer having a glass transition temperature ($T_g$) and/or a melting point ($T_m$), and the printer head action comprises heating the 3D printable material above the glass transition and if it is a semi-crystalline polymer above the melting temperature. In yet another embodiment, the 3D printable material comprises a (thermoplastic) polymer having a melting point ($T_m$), and the printer head action comprises heating the 3D printable material to be deposited on the receiver item to a temperature of at least the melting point. The glass transition temperature is in general not the same thing as the melting temperature. Melting is a transition which occurs in crystalline polymers. Melting happens when the polymer chains fall out of their crystal structures, and become a disordered liquid. The glass transition is a transition which happens to amorphous polymers; that is, polymers whose chains are not arranged in ordered crystals, but are just strewn around in any fashion, even though they are in the solid state. Polymers can be amorphous, essentially having a glass transition temperature and not a melting temperature or can be (semi) crystalline, in general having both a glass transition temperature and a melting temperature, with in general the latter being larger than the former. The glass temperature may e.g. be determined with differential scanning calorimetry. The melting point or melting temperature can also be determined with differential scanning calorimetry.

As indicated above, the invention thus provides a method comprising providing a filament of 3D printable material and printing during a printing stage said 3D printable material on a substrate, to provide said 3D item.

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polycarbonate (PC), Polystyrene (PS), PE (such as expanded-high impact-Polythene (or polyethene), Low density (LDPE) High density (HDPE)), PVC (polyvinyl chloride) Polychloroethene, such as thermoplastic elastomer based on copolyester elastomers, polyurethane elastomers, polyamide elastomers polyolefine based elastomers, styrene based elastomers, etc. Optionally, the 3D printable material comprises a 3D printable material selected from the group consisting of Urea formaldehyde, Polyester resin, Epoxy resin, Melamine formaldehyde, thermoplastic elastomer, etc. Optionally, the 3D printable material comprises a 3D printable material selected from the group consisting of a polysulfone. Elastomers, especially thermoplastic elastomers, are especially interesting as they are flexible and may help obtaining relatively more flexible filaments comprising the thermally conductive material. A thermoplastic elastomer may comprise one or more of styrenic block copolymers (TPS (TPE-s)), thermoplastic polyolefin elastomers (TPO (TPE-o)), thermoplastic vulcanizates (TPV (TPE-v or TPV)), thermoplastic polyurethanes (TPU (TPU)), thermoplastic copolyesters (TPC (TPE-E)), and thermoplastic polyamides (TPA (TPE-A)).

Suitable thermoplastic materials, such as also mentioned in WO2017/040893, may include one or more of polyacetals (e.g., polyoxyethylene and polyoxymethylene), poly($C_{1-6}$ alkyl)acrylates, polyacrylamides, polyamides, (e.g., aliphatic polyamides, polyphthalamides, and polyaramides), polyamideimides, polyanhydrides, polyarylates, polyarylene ethers (e.g., polyphenylene ethers), polyarylene sulfides (e.g., polyphenylene sulfides), polyarylsulfones (e.g., polyphenylene sulfones), polybenzothiazoles, polybenzoxazoles, polycarbonates (including polycarbonate copolymers such as polycarbonate-siloxanes, polycarbonate-esters, and polycarbonate-ester-siloxanes), polyesters (e.g., polycarbonates, polyethylene terephthalates, polyethylene naphtholates, polybutylene terephthalates, polyarylates), and polyester copolymers such as polyester-ethers), polyetheretherketones, polyetherimides (including copolymers such as polyetherimide-siloxane copolymers), polyetherketoneketones, polyetherketones, polyethersulfones, polyimides (including copolymers such as polyimide-siloxane copolymers), poly($C_{1-6}$ alkyl)methacrylates, polymethacrylamides, polynorbornenes (including copolymers containing norbornenyl units), polyolefins (e.g., polyethylenes, polypropylenes, polytetrafluoroethylenes, and their copolymers, for example ethylene-alpha-olefin copolymers), polyoxadiazoles, polyoxymethylenes, polyphthalides, polysilazanes, polysiloxanes, polystyrenes (including copolymers such as acrylonitrile-butadiene-styrene (ABS) and methyl methacrylate-butadiene-styrene (MBS)), polysulfides, polysulfonamides, polysulfonates, polysulfones, polythioesters, polytriazines, polyureas, polyurethanes, polyvinyl alcohols, polyvinyl esters, polyvinyl ethers, polyvinyl halides, polyvinyl ketones, polyvinyl thioethers, polyvinylidene fluorides, or the like, or a combination comprising at least one of the foregoing thermoplastic polymers. Embodiments of polyamides may include, but are not limited to, synthetic linear polyamides, e.g., Nylon-6,6; Nylon-6,9; Nylon-6,10; Nylon-6,12; Nylon-11; Nylon-12 and Nylon-4,6, preferably Nylon 6 and Nylon 6,6, or a combination comprising at least one of the foregoing. Polyurethanes that can be used include aliphatic, cycloaliphatic, aromatic, and polycyclic polyurethanes, including those described above. Also useful are poly($C_{1-6}$ alkyl)acrylates and poly($C_{1-6}$ alkyl)methacrylates, which include, for instance, polymers of methyl acrylate, ethyl acrylate, acrylamide, methacrylic acid, methyl methacrylate, n-butyl acrylate, and ethyl acrylate, etc. In embodiments, a polyolefine may include one or more of polyethylene, polypropylene, polybutylene, polymethylpentene (and co-polymers thereof), polynorbornene (and co-polymers thereof), poly 1-butene, poly(3-methylbutene), poly(4-methylpentene) and copolymers of ethylene with propylene, 1-butene, 1-hexene, 1-octene, 1-decene, 4-methyl-1-pentene and 1-octadecene.

In specific embodiments, the 3D printable material (and the 3D printed material) comprise one or more of polycarbonate (PC), polyethylene (PE), high-density polyethylene (HDPE), polypropylene (PP), polyoxymethylene (POM), polyethylene naphthalate (PEN), styrene-acrylonitrile resin (SAN), polysulfone (PSU), polyphenylene sulfide (PPS), and semi-crystalline polyethylene terephthalate (PET), acrylonitrile butadiene styrene (ABS), poly(methyl methacrylate) (PMMA), polystyrene (PS), and styrene acrylic copolymers (SMMA).

The term 3D printable material is further also elucidated below, but especially refers to a thermoplastic material, optionally including additives, to a volume percentage of at maximum about 60%, especially at maximum about 30 vol. %, such as at maximum 20 vol. % (of the additives relative to the total volume of the thermoplastic material and additives).

The printable material may thus in embodiments comprise two phases. The printable material may comprise a phase of printable polymeric material, especially thermoplastic material (see also below), which phase is especially an essentially continuous phase. In this continuous phase of thermoplastic material polymer additives such as one or more of antioxidant, heat stabilizer, light stabilizer, ultraviolet light stabilizer, ultraviolet light absorbing additive, near infrared light absorbing additive, infrared light absorbing additive, plasticizer, lubricant, release agent, antistatic agent, anti-fog agent, antimicrobial agent, colorant, laser marking additive, surface effect additive, radiation stabilizer, flame retardant, anti-drip agent may be present. The additive may have useful properties selected from optical properties, mechanical properties, electrical properties, thermal properties, and mechanical properties (see also above).

The printable material in embodiments may comprise particulate material, i.e. particles embedded in the printable polymeric material, which particles form a substantially discontinuous phase. The number of particles in the total mixture is especially not larger than 60 vol. %, relative to the total volume of the printable material (including the (anisotropically conductive) particles) especially in applications for reducing thermal expansion coefficient. For optical and surface related effect number of particles in the total mixture is equal to or less than 20 vol. %, such as up to 10 vol. %, relative to the total volume of the printable material (including the particles). Hence, the 3D printable material especially refers to a continuous phase of essentially thermoplastic material, wherein other materials, such as particles, may be embedded. Likewise, the 3D printed material especially refers to a continuous phase of essentially thermoplastic material, wherein other materials, such as particles, are embedded. The particles may comprise one or more additives as defined above. Hence, in embodiments the 3D printable materials may comprises particulate additives.

The printable material is printed on a receiver item. Especially, the receiver item can be the building platform or can be comprised by the building platform. The receiver item can also be heated during 3D printing. However, the receiver item may also be cooled during 3D printing.

The phrase "printing on a receiver item" and similar phrases include amongst others directly printing on the receiver item, or printing on a coating on the receiver item, or printing on 3D printed material earlier printed on the receiver item. The term "receiver item" may refer to a printing platform, a print bed, a substrate, a support, a build plate, or a building platform, etc. Instead of the term "receiver item" also the term "substrate" may be used. The phrase "printing on a receiver item" and similar phrases include amongst others also printing on a separate substrate on or comprised by a printing platform, a print bed, a support, a build plate, or a building platform, etc. Therefore, the phrase "printing on a substrate" and similar phrases include amongst others directly printing on the substrate, or printing on a coating on the substrate or printing on 3D printed material earlier printed on the substrate. Here below, further the term substrate is used, which may refer to a printing platform, a print bed, a substrate, a support, a build plate, or a building platform, etc., or a separate substrate thereon or comprised thereby.

Layer by layer printable material is deposited, by which the 3D printed item is generated (during the printing stage). The 3D printed item may show a characteristic ribbed structures (originating from the deposited filaments). However, it may also be possible that after a printing stage, a further stage is executed, such as a finalization stage. This stage may include removing the printed item from the receiver item and/or one or more post processing actions. One or more post processing actions may be executed before removing the printed item from the receiver item and/or one or more post processing actions may be executed after removing the printed item from the receiver item. Post processing may include e.g. one or more of polishing, coating, adding a functional component, etc. Post-processing may include smoothening the ribbed structures, which may lead to an essentially smooth surface.

Further, the invention relates to a software product that can be used to execute the method described herein. Therefore, in yet a further aspect the invention also provides a computer program product, when running on a computer which is functionally coupled to or comprised by a fused deposition modeling 3D printer, is capable of bringing about the method as described herein.

The herein described method provides 3D printed items. Hence, the invention also provides in a further aspect a 3D printed item obtainable with the herein described method. In a further aspect a 3D printed item obtainable with the herein described method is provided. Especially, the invention provides a The 3D printed item may comprise a plurality of layers on top of each other, i.e. stacked layers. The thickness and height of the layers may e.g. in embodiments be selected from the range of 100-3000 µm, such as 200-2500 µm, with the height in general being smaller than the width. For instance, the ratio of height and width may be equal to or smaller than 0.8, such as equal to or smaller than 0.6.

Likewise, these dimensions may essentially apply to the horizontally printed layers.

Note that it is not necessary that the horizontally printed layers have essentially the same layer width as the first layer and/or that adjacently configured horizontal layers have the same width and height and/or the same overhang dimensions. In specific embodiments, however, these may essentially be the same for those layers that form an array of horizontally printed layers.

Layers may be core-shell layers or may consist of a single material. Within a layer, there may also be a change in composition, for instance when a core-shell printing process was applied and during the printing process it was changed from printing a first material (and not printing a second material) to printing a second material (and not printing the first material).

At least part of the 3D printed item may include a coating.

In yet a further aspect, the invention provides a 3D item comprising 3D printed material, wherein the 3D item comprises a plurality of layers of 3D printed material, wherein the 3D item comprises at least one set of (two or more) adjacent layers comprising (i) a first layer of 3D printed material, wherein the first layer has a first layer top part and a first layer bottom part, the first layer top part being separated from the first layer bottom part in a first direction by a first layer height (H1); and (ii) a second layer of 3D printed material adjacent in contact with the first layer, the second layer being adjacent to the first layer in a second direction substantially perpendicular to the first direction, wherein the second layer has a second layer top part and a second layer bottom part, wherein at least part of the second layer top part extends over at least part of the first layer top part and is conformal therewith.

Such 3D printed item may include one or more layers, each having a cross-section with a kind of metal pea whistle shape, with the inlet part over one adjacent other (second layer). Hence, such 3D printed item may include a plurality of second layers (which may herein also be indicated as array of second layers).

As indicated above, part of a side part, for the sake of definition we may use the first side part, is in physical contact with the first layer, or with a second side part of the first layer. One may even state that part of the first side part of the second layer forms an overhang on the first layer. In this way, at least part of a side surface of the second layer is in contact with and conformal to part of the first layer. However, the overhang is in general defined relative to first layer top part and the second layer top part, wherein, as indicated above, wherein at least part of the second layer top part extends over at least part of the first layer top part and is conformal therewith. Hence, this second layer top part provides together with the first layer top part, the connection, such as by adhesion, and/or covalent binding, and/or chemical binding, between the first layer and the second layer. In this way, horizontally can be printed, without the necessity of a support (for the second layer).

In embodiments, a first layer height (H1) of the first layer may be defined by the first layer top part and the first layer bottom part. In embodiments, a second layer height (H2) of the second layer may be defined by the second layer top part and the second layer bottom part.

Some specific embodiments in relation to the 3D printed item have already been elucidated below when discussing the method. Below, some specific embodiments in relation to the 3D printed item are discussed in more detail.

The second layer may have a characteristic shape, wherein the top part may be essentially influenced by the nozzle during the in-air printing stage. Hence, in embodiments the second layer top part has a second layer top surface, and the second layer bottom part has a second layer bottom surface, wherein in a cross-sectional plane perpendicular to a longitudinal axis (A) of the second layer, the second layer top surface is flat and the second layer bottom surface is curved. Hence, the second layer may be essentially flat at the top, but may be curved at the bottom. This also provides the kind of metal pea whistle shape. Herein, the terms "flat" or "curved" may also refer to essentially flat or essentially curved, respectively. In embodiments, at least the second layer bottom part (or its face) has a higher curvature than the second layer top part (or its face).

As indicated above, the use of a light transmissive material as 3D printable material may be useful e.g. for lighting applications, though other applications may also be considered. Hence, in embodiments the 3D printed material comprises light transmissive material.

As also indicated above, a plurality of second layers may be provided. In such embodiments, the 3D item may (thus) comprise a plurality of second layers, wherein each second layer of which the second layer top part is partly covered by an adjacent second layer is configured as first layer to that adjacent second layer.

The (with the herein described method) obtained 3D printed item may be functional per se. For instance, the 3D printed item may be a lens, a collimator, a reflector, etc. The thus obtained 3D item may (alternatively) be used for decorative or artistic purposes. The 3D printed item may include or be provided with a functional component. The functional component may especially be selected from the group consisting of an optical component, an electrical component, and a magnetic component. The term "optical component" especially refers to a component having an optical functionality, such as a lens, a mirror, a light transmissive element, an optical filter, etc. The term optical component may also refer to a light source (like a LED). The term "electrical component" may e.g. refer to an integrated circuit, PCB, a battery, a driver, but also a light source (as a light source may be considered an optical component and an electrical component), etc. The term magnetic component may e.g. refer to a magnetic connector, a coil, etc. Alternatively, or additionally, the functional component may comprise a thermal component (e.g. configured to cool or to heat an electrical component). Hence, the functional component may be configured to generate heat or to scavenge heat, etc.

As indicated above, the 3D printed item maybe used for different purposes. Amongst others, the 3D printed item maybe used in lighting. Hence, in yet a further aspect the invention also provides a lighting device comprising the 3D item as defined herein. In a specific aspect the invention provides a lighting system comprising (a) a light source configured to provide (visible) light source light and (b) the 3D item as defined herein, wherein 3D item may be configured as one or more of (i) at least part of a housing, (ii) at least part of a wall of a lighting chamber, and (iii) a functional component, wherein the functional component may be selected from the group consisting of an optical component, a support, an electrically insulating component, an electrically conductive component, a thermally insulating component, and a thermally conductive component. Hence, in specific embodiments the 3D item may be configured as one or more of (i) at least part of a lighting device housing, (ii) at least part of a wall of a lighting chamber, and (iii) an optical element. As a relative smooth surface may be provided, the 3D printed item may be used as mirror or lens, etc. In embodiments, the 3D item may be configured as shade. A device or system may comprise a plurality of different 3D printed items, having different functionalities.

Returning to the 3D printing process, a specific 3D printer may be used to provide the 3D printed item described herein. Therefore, in yet a further aspect the invention also provides a fused deposition modeling 3D printer, comprising (a) a printer head comprising a printer nozzle, and (b) a 3D printable material providing device configured to provide 3D printable material to the printer head, wherein the fused deposition modeling 3D printer is configured to provide said 3D printable material thereby providing a 3D item comprising 3D printed material (on a substrate), and (c) a control system (C), wherein the control system (C) is configured to execute in a controlling mode the method as defined herein.

The printer nozzle may include a single opening. In other embodiments, the printer nozzle may be of the core-shell type, having two (or more) openings. The term "printer head" may also refer to a plurality of (different) printer heads; hence, the term "printer nozzle" may also refer to a plurality of (different) printer nozzles.

The 3D printable material providing device may provide a filament comprising 3D printable material to the printer head or may provide the 3D printable material as such, with the printer head creating the filament comprising 3D printable material. Hence, in embodiments the invention provides a fused deposition modeling 3D printer, comprising (a) a printer head comprising a printer nozzle, and (b) a filament providing device configured to provide a filament comprising 3D printable material to the printer head, wherein the fused deposition modeling 3D printer is configured to provide said 3D printable material to a substrate, thereby providing a 3D item comprising 3D printed material, and (c) a control system (C), wherein the control system (C) is configured to execute in a controlling mode the method as defined herein.

Especially, the 3D printer comprises a controller (or is functionally coupled to a controller) that is configured to execute in a controlling mode (or "operation mode") the method as described herein.

The system, or apparatus, or device may execute an action in a "mode" or "operation mode" or "mode of operation".

Likewise, in a method an action or stage, or step may be executed in a "mode" or "operation mode" or "mode of operation". The term "mode" may also be indicated as "controlling mode". This does not exclude that the system, or apparatus, or device may also be adapted for providing another controlling mode, or a plurality of other controlling modes. Likewise, this may not exclude that before executing the mode and/or after executing the mode one or more other modes may be executed.

However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. "on", without further tunability).

Instead of the term "fused deposition modeling (FDM) 3D printer" shortly the terms "3D printer", "FDM printer" or "printer" may be used. The printer nozzle may also be indicated as "nozzle" or sometimes as "extruder nozzle".

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1A:
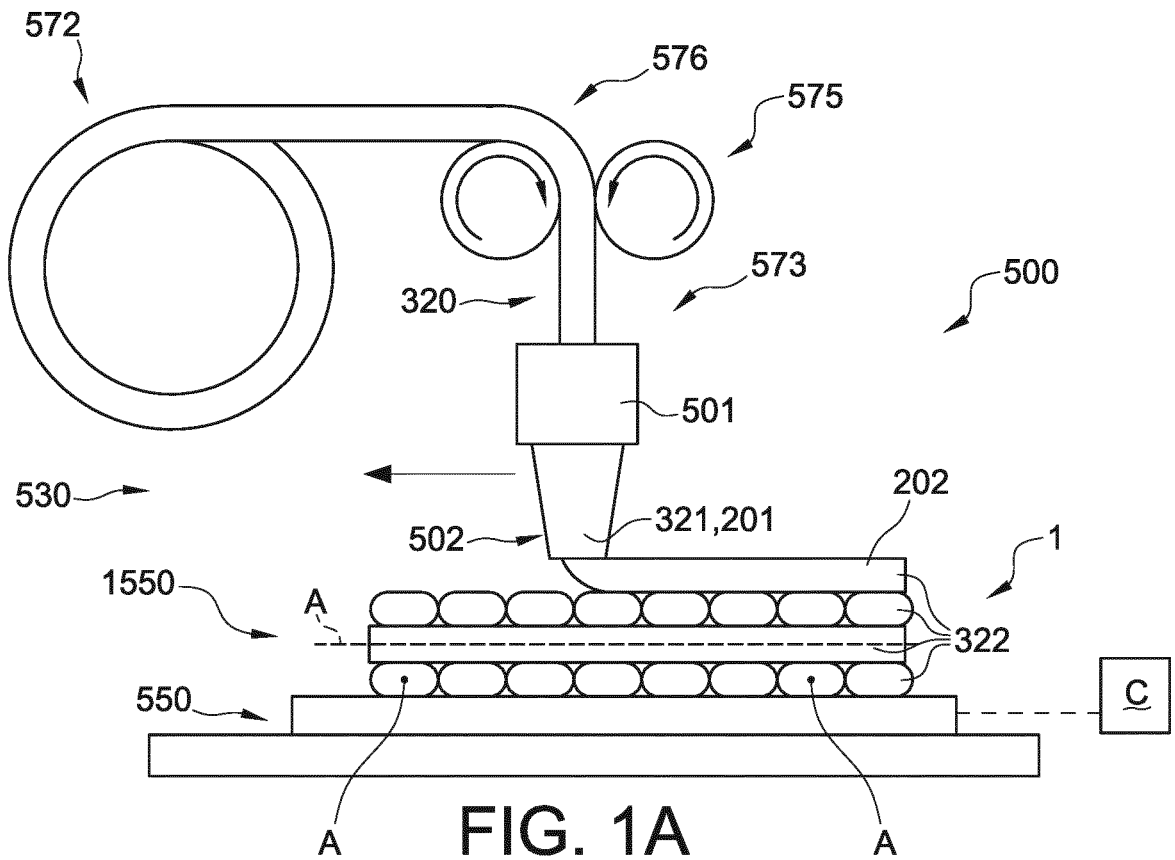
FIGS. 1a-1c schematically depict some general aspects of the 3D printer and of an embodiment of 3D printed material.

FIG. 1a schematically depicts some aspects of the 3D printer. Reference 500 indicates a 3D printer. Reference 530 indicates the functional unit configured to 3D print, especially FDM 3D printing; this reference may also indicate the 3D printing stage unit. Here, only the printer head for providing 3D printed material, such as a FDM 3D printer head is schematically depicted. Reference 501 indicates the printer head. The 3D printer of the present invention may especially include a plurality of printer heads, though other embodiments are also possible. Reference 502 indicates a printer nozzle. The 3D printer of the present invention may especially include a plurality of printer nozzles, though other embodiments are also possible. Reference 321 indicates a filament of printable 3D printable material (such as indicated above). For the sake of clarity, not all features of the 3D printer have been depicted, only those that are of especial relevance for the present invention (see further also below).

The 3D printer 500 is configured to generate a 3D item 1 by layer-wise depositing on a receiver item 550, which may in embodiments at least temporarily be cooled, a plurality of filaments 321 wherein each filament 310 comprises 3D printable material 201, such as having a melting point $T_m$. The 3D printable material 201 may be deposited on a substrate 1550 (during the printing stage).

The 3D printer 500 is configured to heat the filament material upstream of the printer nozzle 502. This may e.g. be done with a device comprising one or more of an extrusion and/or heating function. Such device is indicated with reference 573, and is arranged upstream from the printer nozzle 502 (i.e. in time before the filament material leaves the printer nozzle 502). The printer head 501 may (thus) include a liquefier or heater. Reference 201 indicates printable material. When deposited, this material is indicated as (3D) printed material, which is indicated with reference 202.

Reference 572 indicates a spool or roller with material, especially in the form of a wire, which may be indicated as filament 320. The 3D printer 500 transforms this in a filament 321 downstream of the printer nozzle which becomes a layer 322 on the receiver item or on already deposited printed material. In general, the diameter of the filament 321 downstream of the nozzle is reduced relative to the diameter of the filament 322 upstream of the printer head. Hence, the printer nozzle is sometimes (also) indicated as extruder nozzle. Arranging layer 322 by layer 322 and/or layer 322t on layer 322, a 3D item 1 may be formed. Reference 575 indicates the filament providing device, which here amongst others include the spool or roller and the driver wheels, indicated with reference 576.

Reference A indicates a longitudinal axis of a layer.

Reference C schematically depicts a control system, such as especially a temperature control system configured to control the temperature of the receiver item 550. The control system C may include a heater which is able to heat the receiver item 550 to at least a temperature of 50° C., but especially up to a range of about 350° C., such as at least 200° C.

Alternatively or additionally, in embodiments the receiver plate may also be moveable in one or two directions in the x-y plane (horizontal plane). Further, alternatively or additionally, in embodiments the receiver plate may also be rotatable about z axis (vertical). Hence, the control system may move the receiver plate in one or more of the x-direction, y-direction, and z-direction.

Alternatively, the printer can have a head can also rotate during printing. Such a printer has an advantage that the printed material cannot rotate during printing.

Layers are indicated with reference 322, and have a layer height H and a layer width W.

Note that the 3D printable material is not necessarily provided as filament 320 to the printer head. Further, the filament 320 may also be produced in the 3D printer 500 from pieces of 3D printable material.

Reference D indicates the diameter of the nozzle (through which the 3D printable material 201 is forced).

Figure 1B:
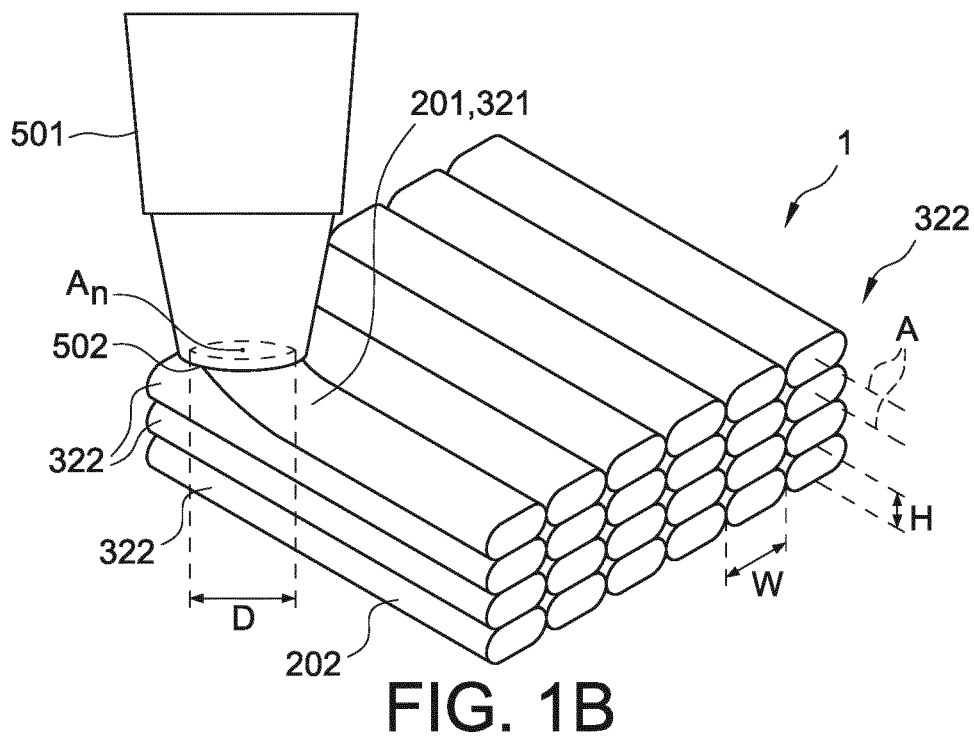

FIG. 1b schematically depicts in 3D in more detail the printing of the 3D item 1 under construction. Here, in this schematic drawing the ends of the filaments 321 in a single plane are not interconnected, though in reality this may in embodiments be the case. Reference H indicates the height of a layer. Layers are indicated with reference 203. Here, the layers have an essentially circular cross-section. Often, however, they may be flattened, such as having an outer shape resembling a flat oval tube or flat oval duct (i.e. a circular shaped bar having a diameter that is compressed to have a smaller height than width, wherein the sides (defining the width) are (still) rounded).

Hence, FIGS. 1a-1b schematically depict some aspects of a fused deposition modeling 3D printer 500, comprising (a) a first printer head 501 comprising a printer nozzle 502, (b) a filament providing device 575 configured to provide a filament 321 comprising 3D printable material 201 to the first printer head 501, and optionally (c) a receiver item 550. In FIGS. 1a-1b, the first or second printable material or the first or second printed material are indicated with the general indications printable material 201 and printed material 202.

Directly downstream of the nozzle 502, the filament 321 with 3D printable material becomes, when deposited, layer 322 with 3D printed material 202. Reference An in FIG. 1b indicates the nozzle area, through which the 3D printable material is extruded to provide the 3D printed material on the substrate (or earlier 3D printed material).

Figure 1C:
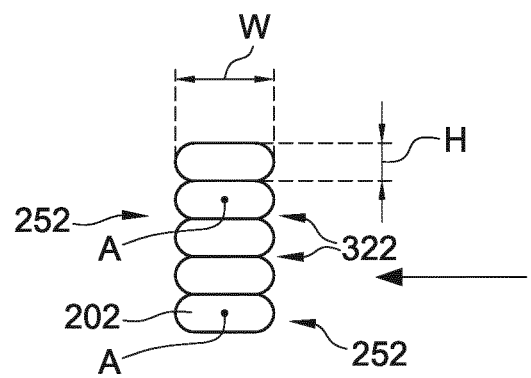

FIG. 1c schematically depicts a stack of 3D printed layers 322, each having a layer height H and a layer width W. Note that in embodiments the layer width and/or layer height may differ for two or more layers 322. Reference 252 in FIG. 1c indicates the item surface of the 3D item (schematically depicted in FIG. 1c).

Referring to FIGS. 1a-1c, the filament of 3D printable material that is deposited leads to a layer having a height H (and width W). Depositing layer 322 after layer 322, the 3D item 1 is generated.

Figure 2A:
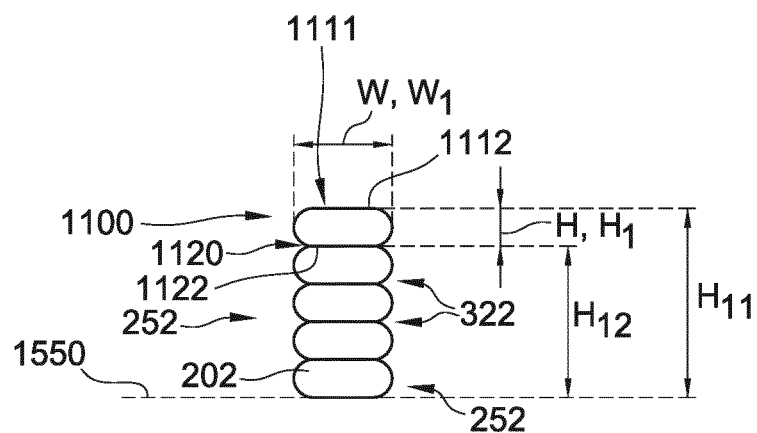
FIGS. 2a-2f schematically depict some aspects.
Figure 2B:
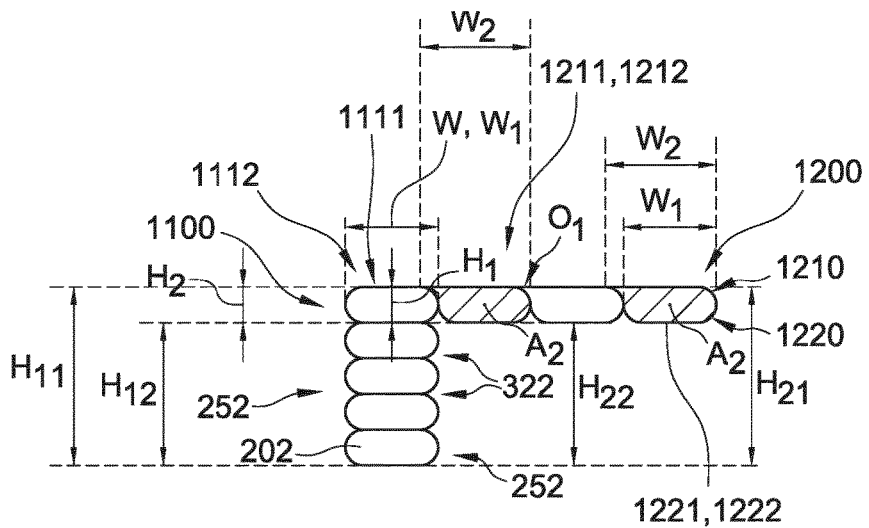

FIGS. 2a and 2b schematically depict in more detail some aspects of the invention. Here, first a schematically embodiment of a 3D printed item 1 with only vertically printed layers is schematically depicted in FIG. 2a, and in FIG. 2b, a schematically embodiment of a 3D printed item 1 with horizontal layers is depicted, here with schematically 3 layers 322 that have been horizontally printed.

The horizontally printed layers may be the result of a method for producing a 3D item 1 by means of fused deposition modelling, the method comprising a 3D printing stage comprising layer-wise depositing an extrudate 321 comprising 3D printable material 201, to provide the 3D item 1 comprising 3D printed material 202, wherein the 3D item 1 comprises a plurality of layers 322 of 3D printed material 202, wherein the 3D printing stage comprises a vertical support providing stage comprising providing a first layer 1100 of 3D printed material 202, wherein the first layer 1100 has a first layer top part 1110 with a first layer top height H11 relative to the substrate 1550 and a first layer bottom part 1120 with a first layer bottom height H12 relative to the substrate 1550, wherein the first layer 1100 has a first layer height H1 defined by the difference between the first layer top height H11 and the first layer bottom height H12, wherein the value of the first layer bottom height H12 is at least equal to the value of the first layer height H1, and an in-air printing stage comprising a supportless depositing a second layer 1200 of 3D printed material 202 in contact with the first layer 1100, the second layer 1200 being adjacent to the first layer 1100 in a second direction substantially parallel to the substrate 1550, wherein the second layer 1200 has a second layer top part 1210, wherein at least part of the second layer top part 1210 extends over at least part of the first layer top part 1100 and is conformal therewith. The overhang or overlapping part is indicated with O1 (see e.g. FIGS. 2e and 2f, and 3c and 3d, for a bit more detail in relation to the overhang).

Here, the first layer 1100 has a height H12 over the substrate of about 4*the layer height H, which is, herein for the sake of understanding of the horizontal printing process also indicated as first layer height H1. Here, it is assumed that essentially all layers have essentially the same height H of H1.

The width W of the first layer is indicated with reference W1.

Note that the 3D printed layers have curved edges, which allow the formation of the overhang by a second layer. As shown in—amongst others—FIG. 2a, the width especially refers to the largest width (perpendicular to a layer axis). The width W or W1 may thus vary over the height of the layer.

FIG. 2b also very schematically depicts an embodiment of a 3D item 1 comprising 3D printed material 202, wherein the 3D item 1 comprises a plurality of layers 322 of 3D printed material 202, wherein the 3D item 1 comprises at least one set of adjacent layers 322. Here, there is a set of four adjacent layers 322, which are further indicated with references 1100 and 1200 for the sake of understanding of the in-air printing stage.

The adjacent layers comprise a first layer 1100 of 3D printed material 202, wherein the first layer 1100 has a first layer top part 1110 and a first layer bottom part 1120, the first layer top part 1110 being separated from the first layer bottom part 1120 in a first direction by a first layer height H1. The most left (top) layer is at least considered to be an embodiment of the first layer 100. The set of adjacent layers also comprises a second layer 1200 of 3D printed material 202 in contact with the first layer 1100, the second layer 1200 being adjacent to the first layer 1100 in a second direction substantially perpendicular to the first direction, wherein the second layer 1200 has a second layer top part 1210 and a second layer bottom part 1220, wherein at least part of the second layer top part 1210 extends over at least part of the first layer top part 1100 and is conformal therewith.

Like the first layer, the second layer 1200 may schematically be divided in different parts. The second layer has a second layer top part 1210 with a second layer top height H21 relative to the substrate and a second layer bottom part 1220 with a second layer bottom height H22 relative to the substrate. The height H2 of the second layer 1200 may thus also be defined by the distance between second layer top height H21 and the second layer bottom height H22.

Actually, in this schematically depicted embodiment, the set of adjacent layers comprises a plurality of second layers 1200, wherein each second layer 1200 of which the second layer top part 1210 is partly covered by an adjacent second layer 1200 is (actually also) configured as first layer 1100 to that adjacent second layer 1200.

As schematically indicated in the drawing the second layer top part 1210 has a second layer top surface 1211 and the second layer bottom part 1220 has a second layer bottom surface 1221.

As can be derived from FIG. 2b, the first layer 1100 may be a top layer of a stack of layers. However, as is also clear from this schematic drawing, the first layer 1100 is not necessarily a top layer of a stack of layers; it might in principle also be an intermediate layer of a stack of 3D printed layers.

Figure 2C:
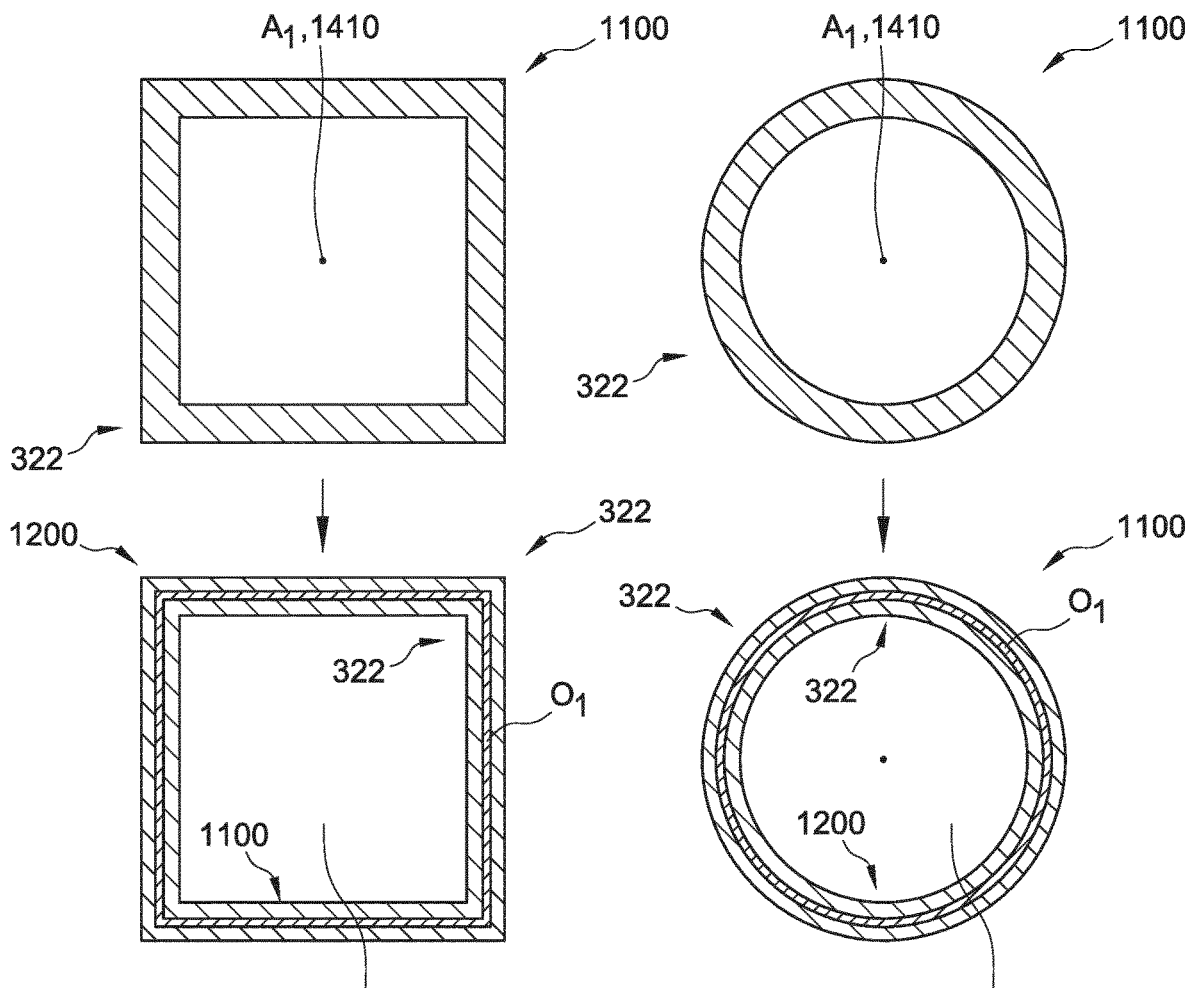

FIG. 2c very schematically depicts embodiments wherein the first layer 1100 is configured as a first enclosure 1410 enclosing a first cross-sectional area A1, with the two left graphs schematically showing a rectangular enclosure, and with the two left graphs schematically showing a circular enclosure. The method may in embodiments comprises depositing the second layer 1200 of 3D printed material 202 adjacent to and in contact with the first layer 1100 to provide a second enclosure 1420 having a second cross-sectional area A2 being larger (lower left graph) or smaller (lower right graph) than the first cross-section A1.

Figure 2D:
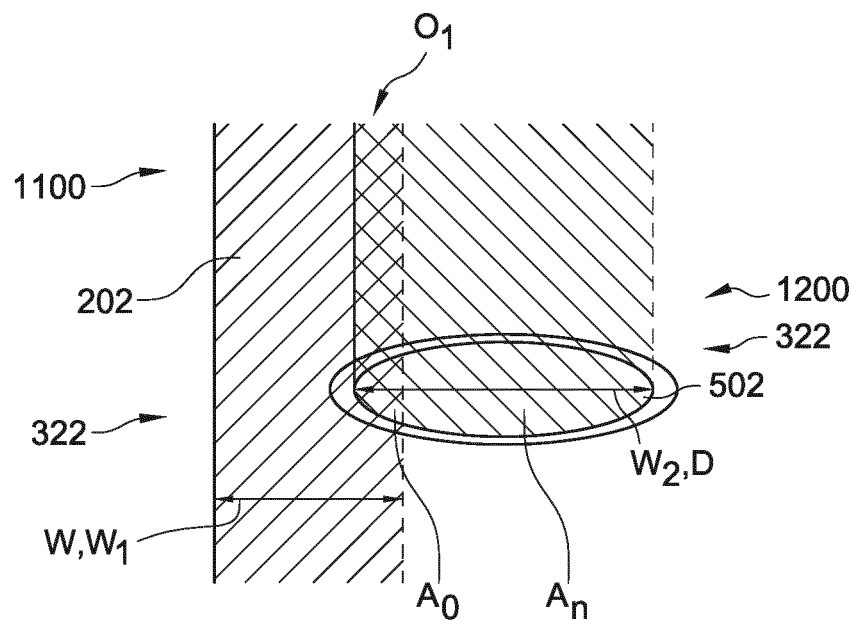

FIG. 2d schematically depicts an embodiment wherein the nozzle is schematically drawn over part of the first layer 1100. Here, the printer nozzle 502 has a nozzle area An. By way of example, the nozzle 502 has an oval shape. The in-air printing stage comprises supportless depositing the second layer 1200 while maintaining 10-50% of the nozzle area (An) over the first layer at a maximum distance of 0.5*H1 (in this top view, the height is not shown, as this high is perpendicular to the plane of drawing, see however FIG. 3b). Reference Ao indicates the area of the nozzle area that is at such height, indicated with reference Hn, of at maximum 0.5*H1. This may also lead to the formation of the overhang O1 of part of the second layer 1200 over part of the first layer 1100.

Alternatively, in embodiments, the first layer has a first layer width W1, wherein the printer nozzle has a nozzle width D, wherein the method comprises maintaining the printer nozzle partly over the first layer such that a projection in a horizontal plane of the first layer width W1 and the nozzle width D have an overlap O1 selected from the range of 10-50%, especially 15-35% of the first layer width W1.

Figure 2E:
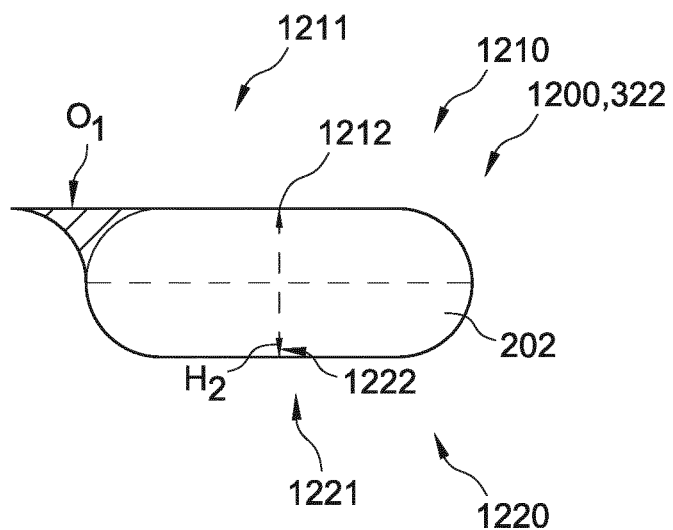

FIG. 2e very schematically depicts a second layer, with second layer top part 1210 and second layer bottom part 1220. The former has a face 1211 and the latter has a face 1221. The highest part of the top part 1210 is indicated with reference 1212, and the lowest part of the bottom part is indicated with reference 1221. The height is indicated with reference H2. Note that here the face 1221 of the bottom part 1220 is essentially flat. In general, however, this maybe more curved (see also FIGS. 3c-3d). The part of the top part 1210 that form the overhang is indicated with reference O1 and is, for the sake of understanding, hatched. However, this part will in essentially be of the same material as the remainder of (the outer layer of) the second layer 1200.

Figure 2F:
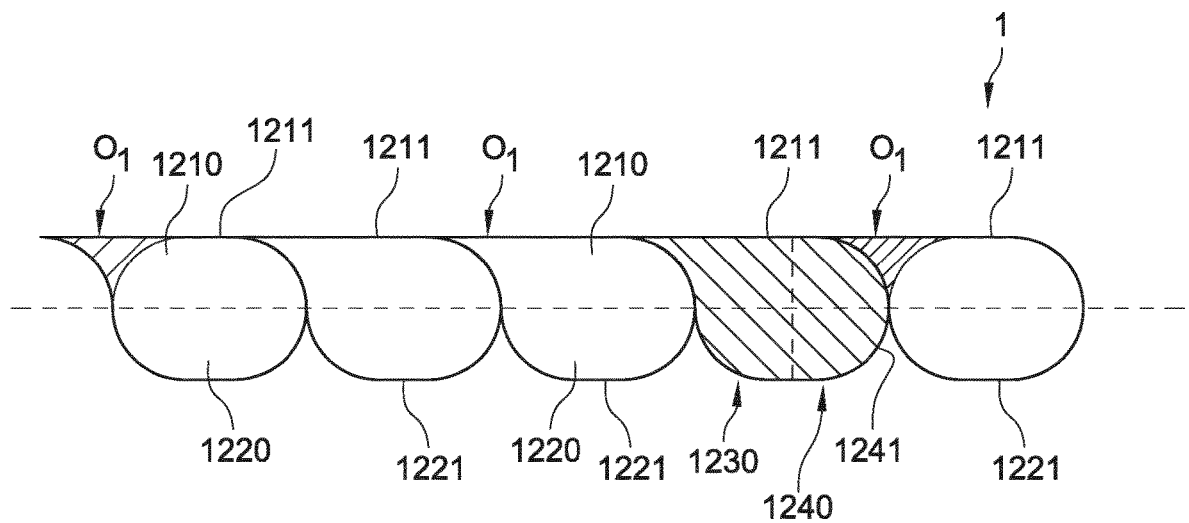

FIG. 2f schematically depicts an embodiment comprising a plurality of second layers 1200, wherein each second layer 1200 of which the second layer top part 1210 is partly covered by an adjacent second layer 1200 is configured as first layer 1100 to that adjacent second layer 1200.

As indicated above, the first layer has a first layer top part 1210 and a first layer bottom part 1220. Thus, the layer may be divided in a top part and a bottom part. In embodiments, they may each relate to 50% of the layer (in a cross-sectional view), though other ratios may also be possible.

Another subdivision may be a first side part 1230 and a second side part 1240. In embodiments, they may each relate to 50% of the layer (in a cross-sectional view), see FIG. 2f with the second layer 1200 from the right, with two hatched areas. The cross-sectional view may refer to a view perpendicular to a layer axis. In embodiments, it may refer to two halves, with a vertical division plane. The first side part 1230 has a face 1231 and the second side part 1240 has a face 1241. At least part of the former is in contact with the first layer 1100 (which may be an earlier printed second layer 1200); part of the latter may be in contact with an adjacent later printed second layer 1200 (as is here schematically depicted).

Figure 3A:
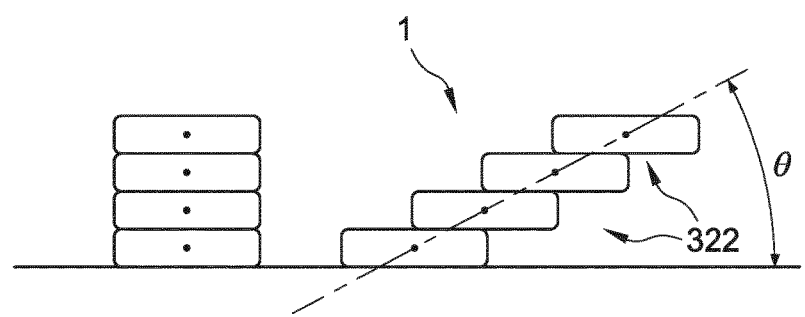
FIGS. 3a-3j schematically depict some aspects.

Typically, layers with a constant thickness and a constant width can be deposited on top of each other to reach at maximum angles of 45° (see FIG. 3a). This graph shows typical options for FDM printing with maximum overlap area of 50% with constant layer thickness. Hence, as shown in this figure, the layers 322 have longitudinal axes A and a plane parallel with two or more have longitudinal axes A has a smallest angle θ with a horizontal selected from the range of 0-45°. Two or more longitudinal axes A are coinciding with the plane. The plurality of layers may also provide a curved shape. In such embodiments, a plane tangential to two or more of the plurality of the longitudinal axes A has a smallest angle θ with a horizontal selected from the range of 0-45°. Such plane may also be parallel to the two or more longitudinal axes A.

As indicated above, herein a new method is suggest which may include combining horizontal printing with vertical printing in order to print objects with angles less than 45°. Using his approach, it was amongst others possible to print cones with an angle<45°.

Figure 3B:
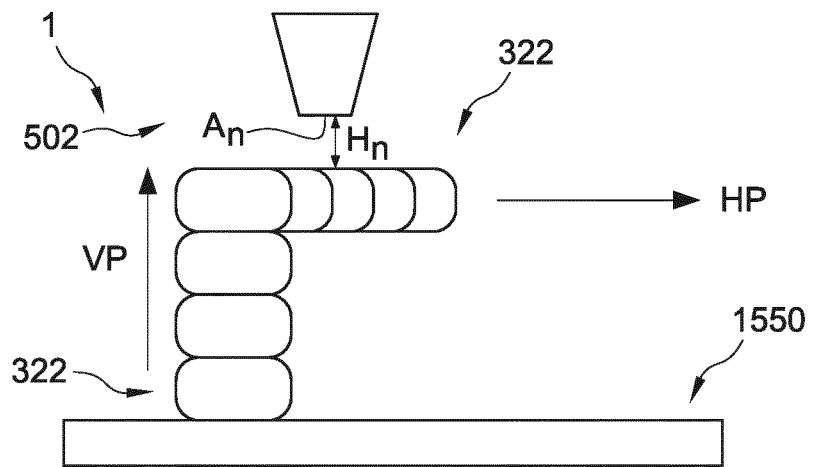

Horizontal printing of overhangs can be realized by various ways. One can print an object for example a cylinder up to a certain height by stapling layers of polymer on top of each other in the vertical direction. Subsequently the nozzle is set to move in the x-y plane and deposit layers which have an overlapping area of at maximum of 50%. This means that the nozzle is partly blocked—at most for 50%—by the previous printed layer and deposits the amount of layer next to it. FIG. 3b shows schematic drawing of a cross-section of such a print. Reference VP indicates vertical printing and reference HP indicates horizontal printing.

Especially, the layers connect to each other by adhesion. Further, the previous printed layer may be solidified and has strength so that the new layer can be deposited. However, its temperature (or the temperature of the part that will be in contact with the second layer) may be at least the glass transition temperature. Cooling and/or heating of the first layer 1100, temperature of nozzle, Tg of material, speed and flow rate of material may be controlled to realize the structure.

Figure 3C:
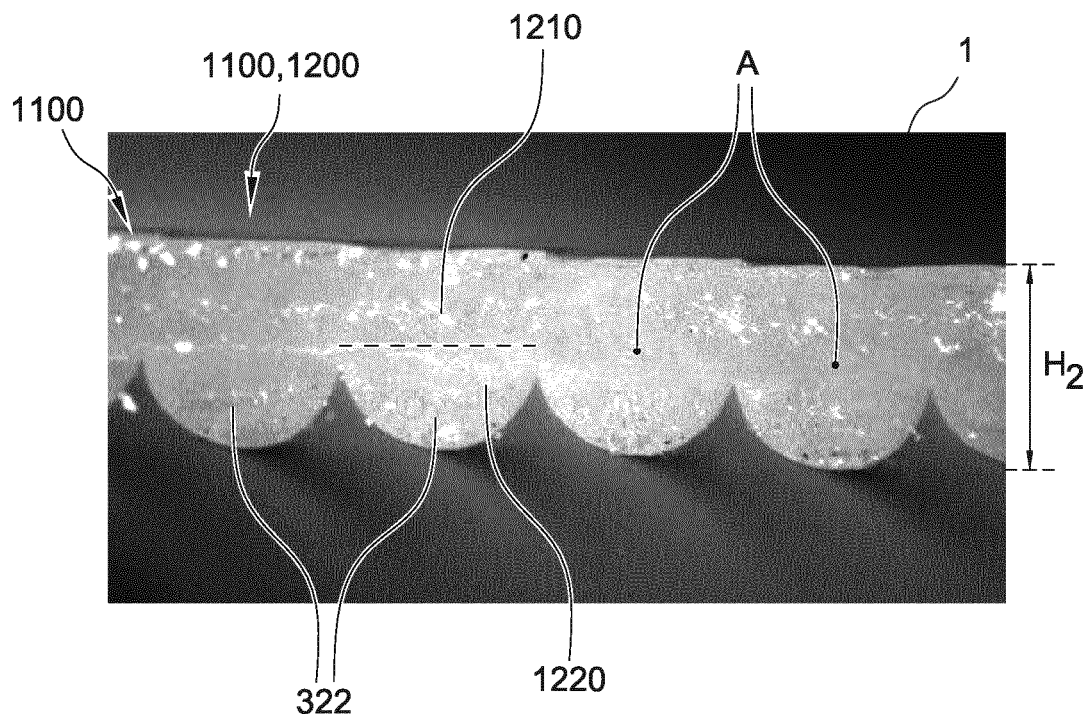
Figure 3D:
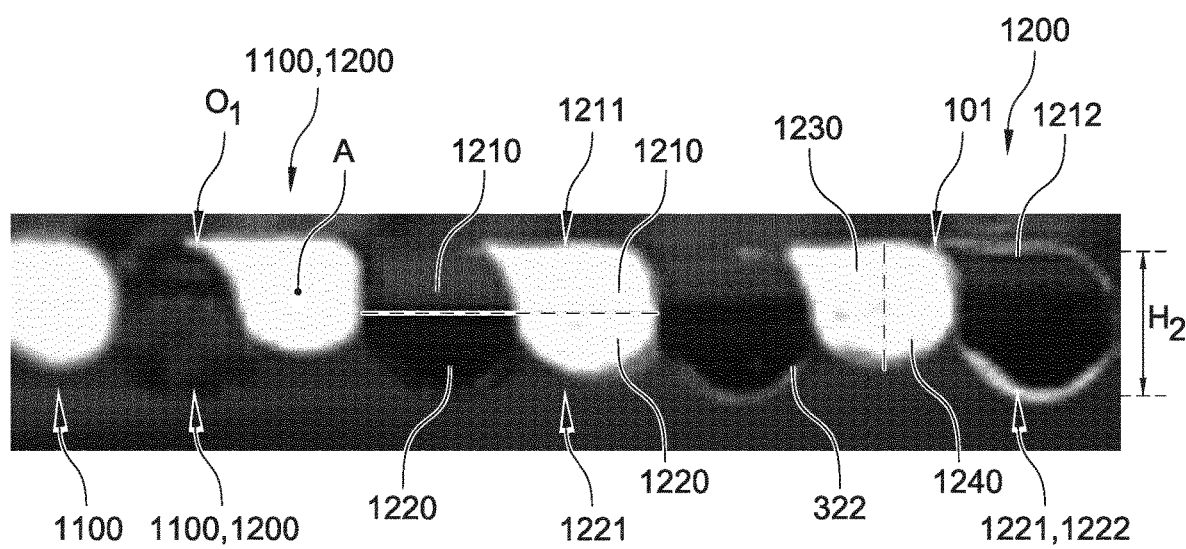

FIGS. 3c and 3d show embodiments of 3D printed structures including the in-air printing stage. Clearly the structure is flattened at the top side where the overlap of the nozzle was. Depending on the overlapping area the roughness (steps between the sequential layers) can be tuned. FIG. 3d shows the cross-section of a horizontally printed structure in air where black and white filaments were used. The overhangs O1 is clearly visible. It can also be seen that in a cross-sectional plane perpendicular to a longitudinal axis A of the second layer 1200 the second layer top surface 1211 is flat and the second layer bottom surface 1221 is curved. FIGS. 3c and 3d show graphs of cross sections of 25% overlapping structures printed horizontally in air; with in FIG. 3c only transparent layers and in FIG. 3d alternating white and black layers.

Note that due to this 3D printing process the height H2 of the second layer may be identical, but may also be larger or smaller than of the first layer 1100 (which is not also be configured as second layer).

FIG. 3c above shows the microscopic image of cross section of overhang structure. Clearly, the top part is much smoother than the bottom part. At the top small steps are seen which are separated 1 mm from each other. The bottom part shows half spheres. The bottom is formed rather accurately concerning that it is printed in air; the distance between the half sphere shapes is also 1 mm distance. FIG. 3d shows in detail the formation of the overhang for 25% overlap between the white and black layers. Due to a small blocking part of 25%, the adherences is made to the previous layer, while the rest forms a nice droplet, with a rather smooth top as the nozzle flattens this part.

As shown in FIGS. 3c and 3d, the second layer bottom part 1220 (or its face 1221) has a higher curvature than the second layer top part 1210 (or its face 1211); the latter may be essentially flat.

In order to print objects with inclination angles less than 45° with respect to building plate surface one needs to combine horizontal printing with vertical layers as shown below examples.

Figure 3E:
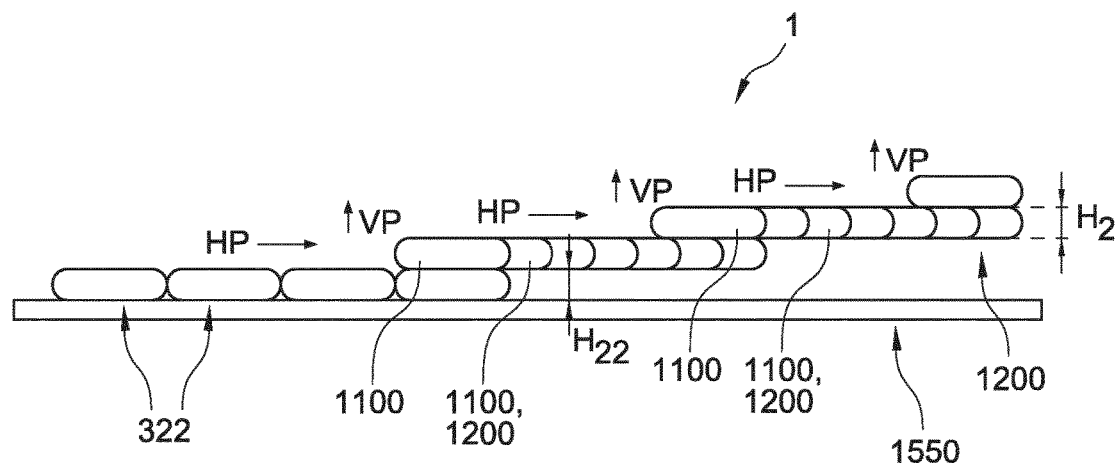
Figure 3F:
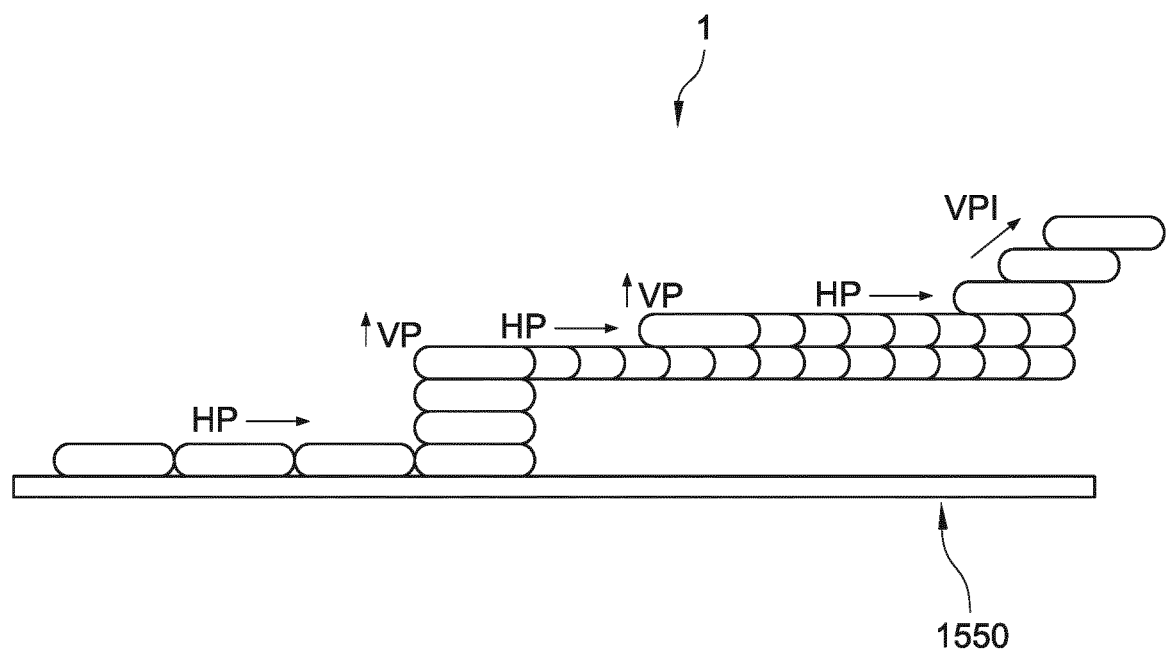

FIGS. 3e and 3f schematically shows examples of possible ways of combining horizontal and vertical printing strategies.

Figure 3G:
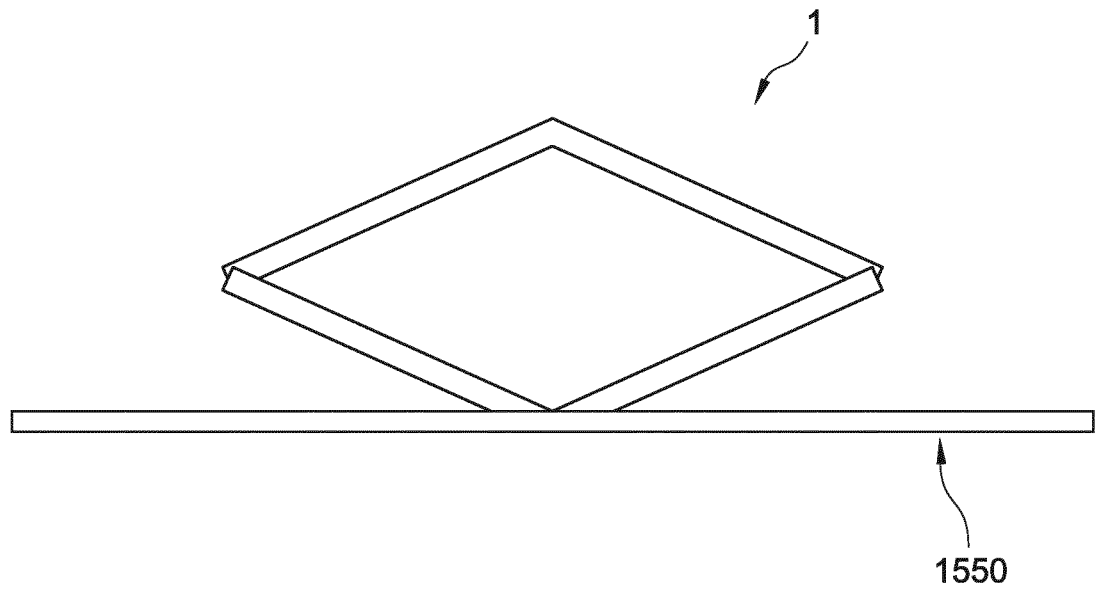
Figure 3H:
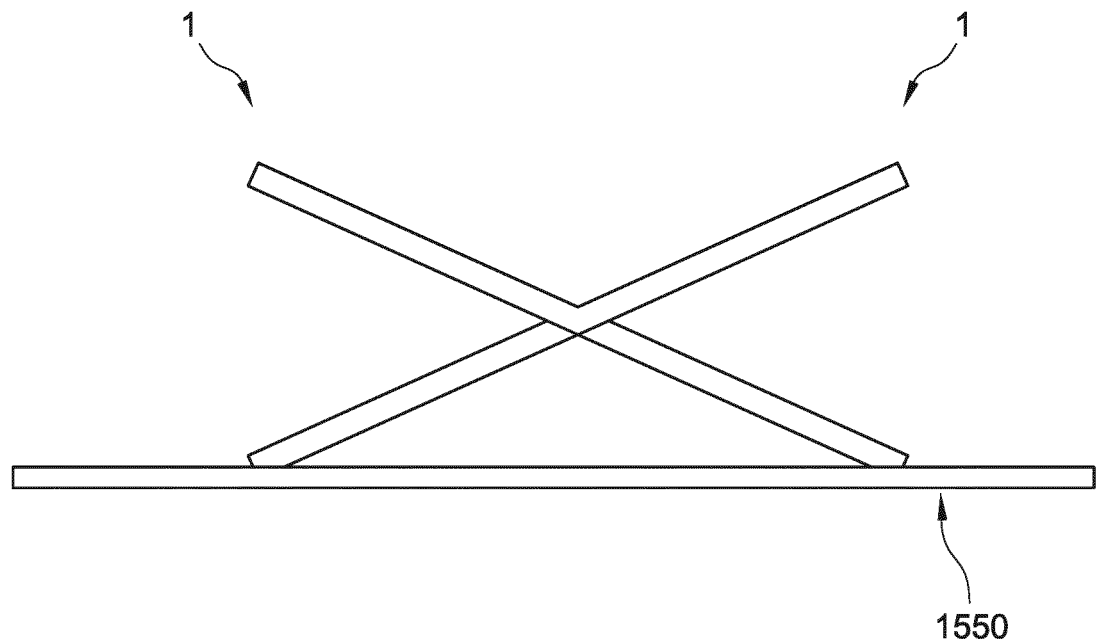

With these strategies various prints can be produced. In FIGS. 3g and 3h, cross-sections of cones are schematically shown. It can be seen that when the printing is from outside towards inside then the cone angle faces downwards. In order to get the cone angle to face upwards printing must start from inside and move to outside. The reference HP indicates (the result of) horizontal printing and the reference VP indicates (the result of) vertical printing.

Figure 3I:
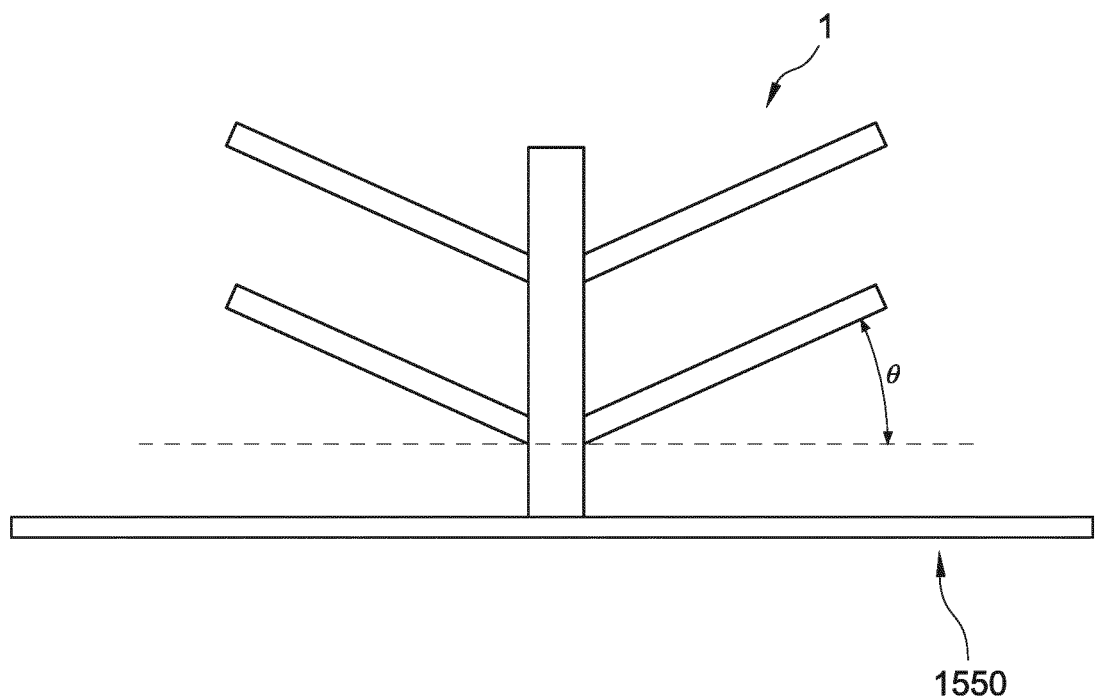

For producing angles (θ) all facing down or all up help structures need to be used such as the ones used below in FIG. 3i. Thus, printing is done from the help structure such as a rod outwards 3i or from the sides of a cylinder, etc. In this way objects can be made with angles of θ<45° without support structure.

Figure 3J:
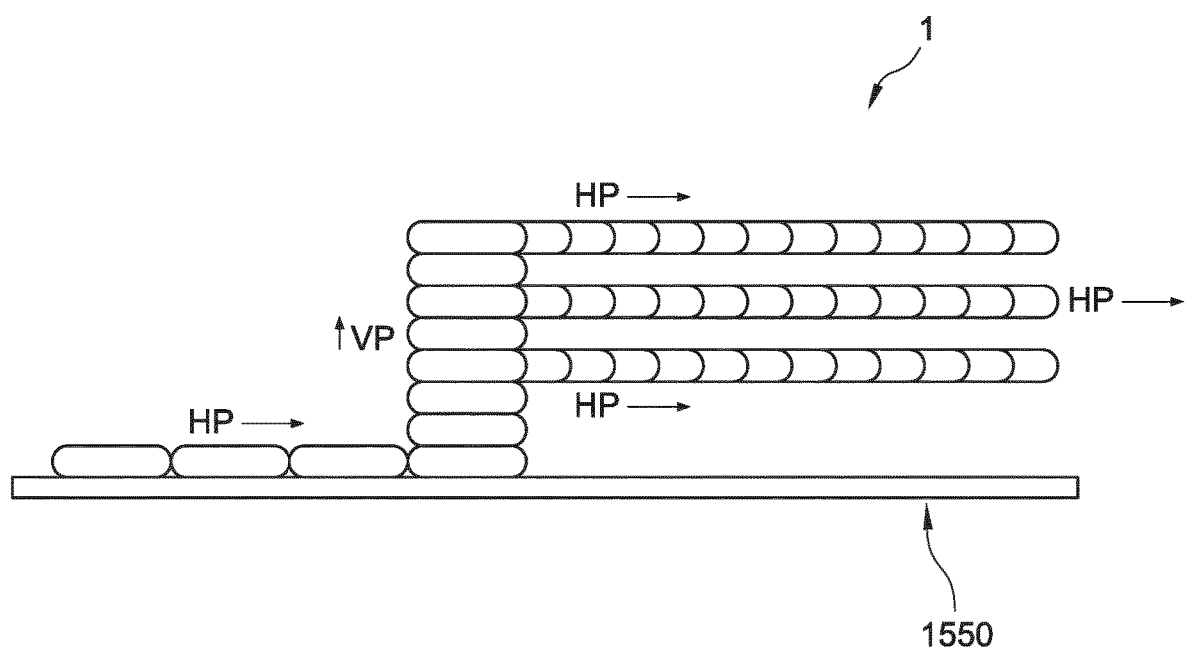
Figure 4:
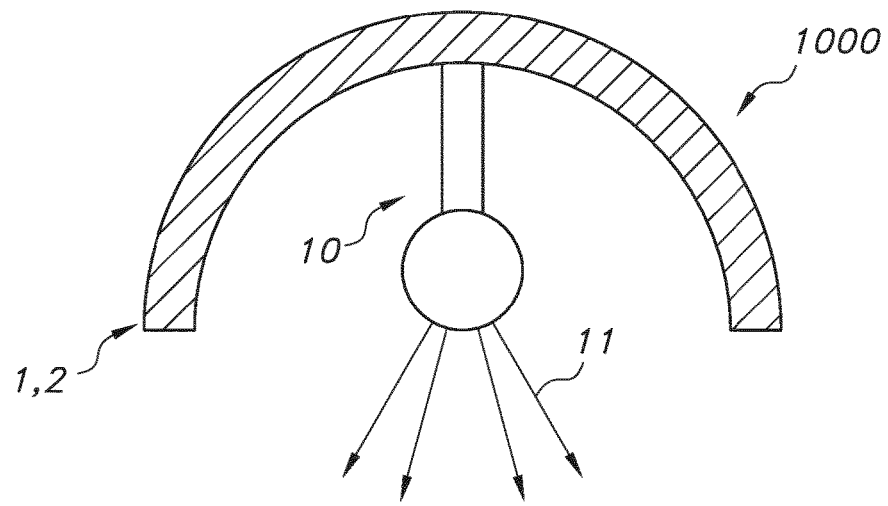
FIG. 4 schematically depicts an aspect of the invention.

When using light transmissive materials, the shape of the second layers are such that they ben be relatively reflective. Hence, using the horizontal printing process, reflective 3D printed items (or item parts) may be generated. Multi-layers may have an even higher reflectivity. Hence, using these strategies, one can also produce multi-layer which can be reflective having strong hiding properties as shown in FIG. 3j.

Transparent and white reflective polymers were used in order to print a cone with a low angle using the strategies described above.

A 3D printed cone of light transmissive material with inside a light source was created. It was observed that the cone has highly reflective appearance. This may be desired (certain) in lighting applications.

For a good adhesion to the previous layers, the nozzle opening should not be fully blocked but is especially only partly blocked, and that the printed part (overhang) remains flat, so that each layer can be placed at essentially the same height attached to the previous one.

3D printed items were made from amongst others, PET and PC. However, other materials may also be suitable An item was printed with a nozzle with diameter of 1.8 mm. Layer heights were chosen at 1.0 mm (but also 0.1-1.4 mm are options). PET has a Tg of 70° C., the substrate was kept at a temperature of 80° C. The nozzle temperate was in the range of 240-260° C., and flow rates were selected in the range of 5-30 mm$^3$/s. PC has a Tg of 145° C. Then, the substrate was kept at 160° C., and nozzle temperature in the range of 270-300° C.; flow rates were selected in the range of 5-30 mm$^3$/s.

A conical like item and a disk like item were created, with both materials, respectively. For the both items, the overhangs remain essentially in plane. Hence the final products were amongst others a disc (round, square or other form) with an opening in the center.

The term "substantially" herein, such as "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention also provides a control system that may control the apparatus or device or system, or that may execute the herein described method or process. Yet further, the invention also provides a computer program product, when running on a computer which is functionally coupled to or comprised by the apparatus or device or system, controls one or more controllable elements of such apparatus or device or system.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

It goes without saying that one or more of the first (printable or printed) material and second (printable or printed) material may contain fillers such as glass and fibers which do not have (to have) influence on the on $T_g$ or $T_m$ of the material(s).

The invention claimed is:

1. A method for producing a 3D item by means of fused deposition modelling, the method comprising a 3D printing stage comprising layer-wise depositing an extrudate comprising 3D printable material, to provide the 3D item comprising 3D printed material, wherein the 3D item comprises a plurality of layers of 3D printed material, wherein the 3D printing stage comprises:

a vertical support providing stage comprising providing a first layer of 3D printed material, wherein the first layer has a first layer top part with a first layer top height relative to a substrate and a first layer bottom part with a first layer bottom height relative to the substrate, wherein the first layer has a first layer height defined by a difference between the first layer top height (H1) and the first layer bottom height, wherein a value of the first layer bottom height is at least equal to the value of the first layer height, an in-air printing stage comprising supportless depositing a second layer of 3D printed material in contact with the first layer and adjacent to the first layer in a direction substantially parallel to the substrate, wherein the second layer has a second layer top part, wherein at least part of the second layer top part extends over at least part of the first layer top part and is conformal therewith, and wherein a fused deposition modeling 3D printer, comprising a printer head comprising a printer nozzle, is used, wherein the printer nozzle has a nozzle area (An), wherein the in-air printing stage comprises supportless depositing the second layer while maintaining 10-50% of the nozzle area (An) over the first layer at a maximum distance of $0.5*H1$.

2. The method according to claim 1, wherein the in-air printing stage comprises supportless depositing the second layer while maintaining 15-35% of the nozzle area (An) over the first layer at a maximum distance of $0.5*H1$.

3. The method according to claim 1, wherein the 3D printable material has a first glass transition temperature Tg1, wherein the in-air printing stage comprises the supportless depositing of the second layer of 3D printed material adjacent to and in contact with the first layer wherein the first layer is at a temperature of at least the first glass transition temperature Tg1 or wherein a part of the first layer that is contacted with a part of the second layer is brought at a temperature of at least the first glass transition temperature Tg1.

4. The method according to claim 1, wherein the first layer is configured as a first enclosure enclosing a first cross-sectional area, and wherein the method comprises depositing the second layer of 3D printed material adjacent to and in contact with the first layer to provide a second enclosure having a second cross-sectional area being larger or smaller than the first cross-sectional area.

5. The method according to claim 1, comprising executing the in-air printing stage a plurality of times, wherein the second layer obtained in an in-air printing stage that is followed by a next in-air printing stage, is used as the first layer in that next in-air printing stage.

6. The method according to claim 5, wherein the layers have longitudinal axes (A) and wherein a plane parallel or tangential to two or more of the plurality of the longitudinal axes (A) has a smallest angle (θ) with a horizontal selected from the range of 0-45°.

7. The method according to claim 1, wherein the 3D printable material comprises light transmissive material.

* * * * *